United States Patent
Chen et al.

(10) Patent No.: US 9,992,815 B2
(45) Date of Patent: Jun. 5, 2018

(54) METHOD OF PERFORMING HANDOVER PROCEDURE, MAKING HANDOVER DECISION FOR DEVICE-TO-DEVICE COMMUNICATIONS AND CONTROL NODE THEREOF

(71) Applicant: Industrial Technology Research Institute, Hsinchu (TW)

(72) Inventors: Ho-Yuan Chen, New Taipei (TW); Mei-Ju Shih, Taichung (TW); Hung-Yu Wei, Taipei (TW); Hua-Lung Tsai, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 158 days.

(21) Appl. No.: 14/970,554

(22) Filed: Dec. 16, 2015

(65) Prior Publication Data
US 2016/0302119 A1    Oct. 13, 2016

Related U.S. Application Data

(60) Provisional application No. 62/144,954, filed on Apr. 9, 2015.

(51) Int. Cl.
| | |
|---|---|
| *H04W 76/14* | (2018.01) |
| *H04W 56/00* | (2009.01) |
| *H04W 36/00* | (2009.01) |

(52) U.S. Cl.
CPC ........... *H04W 76/14* (2018.02); *H04W 36/00* (2013.01); *H04W 56/002* (2013.01)

(58) Field of Classification Search
CPC ..... H04W 36/00; H04W 48/00; H04W 74/14; H04W 56/002
See application file for complete search history.

(56) References Cited

U.S. PATENT DOCUMENTS

| | | | |
|---|---|---|---|
| 9,629,057 B2 * | 4/2017 | Fukuta | H04W 36/38 |
| 2013/0102314 A1 | 4/2013 | Koskela et al. | |

(Continued)

FOREIGN PATENT DOCUMENTS

| | | |
|---|---|---|
| CN | 104349402 | 2/2015 |
| TW | 201424441 | 6/2014 |

(Continued)

OTHER PUBLICATIONS

"Office Action of Taiwan Counterpart Application", dated Mar. 17, 2017, p. 1-p. 9.

(Continued)

*Primary Examiner* — Ian N Moore
*Assistant Examiner* — Ronald H Davis
(74) *Attorney, Agent, or Firm* — JCIPRNET

(57) ABSTRACT

A method of performing a handover procedure for device-to-device (D2D) communications and a control node thereof are proposed. The method is applicable to a first control node serving a D2D communication between a first user equipment (UE) and a second UE. The method includes: determining that one of the first UE and the second UE needs to be handed over or both of the first UE and the second UE need to be handed over; transmitting a handover request to a second control node if the first control node determines that both of the first UE and the second UE need to be handed over to the second control node; receiving a handover request acknowledgement from the second control node; and transmitting a handover command to indicate the first UE and the second UE to detach from the first control node and synchronize to the second control node.

23 Claims, 7 Drawing Sheets

(56) References Cited

U.S. PATENT DOCUMENTS

| | | | |
|---|---|---|---|
| 2013/0150051 A1* | 6/2013 | Van Phan | H04W 12/04 455/437 |
| 2013/0308598 A1 | 11/2013 | Madan et al. | |
| 2013/0324114 A1 | 12/2013 | Raghothaman et al. | |
| 2014/0099958 A1 | 4/2014 | Wilhelmsson et al. | |
| 2014/0105178 A1 | 4/2014 | Jang et al. | |
| 2014/0135019 A1 | 5/2014 | Jang et al. | |
| 2014/0295826 A1 | 10/2014 | Choi et al. | |
| 2015/0141000 A1* | 5/2015 | Yilmaz | H04W 76/023 455/426.1 |
| 2015/0146687 A1* | 5/2015 | Kim | H04W 76/023 370/331 |
| 2015/0195865 A1* | 7/2015 | Lee | H04W 36/0061 455/426.1 |
| 2015/0271733 A1* | 9/2015 | Li | H04W 76/043 455/445 |
| 2015/0373611 A1* | 12/2015 | Liu | H04W 36/0083 455/436 |
| 2016/0021594 A1* | 1/2016 | Yilmaz | H04W 36/30 370/332 |
| 2016/0100355 A1* | 4/2016 | Chen | H04W 8/005 370/232 |
| 2017/0034842 A1* | 2/2017 | Xu | H04W 4/00 |

FOREIGN PATENT DOCUMENTS

| | | |
|---|---|---|
| TW | 201505459 | 2/2015 |
| WO | 2012113136 | 8/2012 |
| WO | 2014081354 | 5/2014 |
| WO | 2014117369 | 8/2014 |
| WO | 2014134831 | 9/2014 |

OTHER PUBLICATIONS

Yilmaz et al., "Smart Mobility Management for D2D Communications in 5G Networks," IEEE WCNC 2014—Workshop on Device-to-Device and Public Safety Communications, Apr. 6-9, 2014, pp. 219-223.

Raghothaman et al., "Architecture and Protocols for LTE-based Device to Device Communication," 2013 International Conference on Computing, Networking and Communications, Wireless Networks Symposium, Jan. 28-31, 2013, pp. 895-899.

Xu et al., "Transmission Mode Selection and Communication Establishment in the Hybrid Device-to-Device and Cellular Networks," 2012 Fourth International Conference on Ubiquitous and Future Networks (ICUFN), Jul. 4-6, 2012, pp. 156-161.

Liu et al., "Mode Selection for Device-to-Device (D2D) Communication under LTE-Advanced Networks," 2012 IEEE International Conference on Communications (ICC), Jun. 10-15, 2012, pp. 5563-5567.

Doppler et al., "Device-to-Device Communication as an Underlay to LTE-Advanced Networks," IEEE Communications Magazine, Dec. 2009, pp. 42-49.

Yang et al., "Solving the data overload: Device-to-device bearer control architecture for cellular data offloading," IEEE vehicular technology magazine, Mar. 2013, pp. 31-39.

* cited by examiner

METHOD OF PERFORMING HANDOVER PROCEDURE, MAKING HANDOVER DECISION FOR DEVICE-TO-DEVICE COMMUNICATIONS AND CONTROL NODE THEREOF

CROSS-REFERENCE TO RELATED APPLICATION

This application claims the priority benefits of U.S. provisional application Ser. No. 62/144,954, filed on Apr. 9, 2015. The entirety of the above-mentioned patent application is hereby incorporated by reference herein and made a part of this specification.

BACKGROUND OF THE INVENTION

1. Field of the Invention

The disclosure is directed to a method of performing a handover procedure and a method of making a handover decision for device-to-device (D2D) communications and a control node thereof.

2. Description of Related Art

Considering device mobility in D2D communications, it is unable to support D2D handover in legacy Long Term Evolution (LTE) system. Although various methods have been proposed heretofore, there are several drawbacks, such as latency, extra resources, and extra signalling exchange in LTE system.

For example, when the Proximity-based Services (ProSe) capable user equipments (UEs) are performing ongoing D2D communication in the same cell and moving in the same direction, one of the ProSe capable UEs may be handed over to its neighboring cell. Therefore, the D2D communication may be interrupted as one of the ProSe capable UE performs LTE handover, and the ProSe capable UEs need to re-establish the D2D communication. When the other ProSe capable UE is handed over to its neighboring cell, the D2D communication may be interrupted again. When they both enter the same cell, the D2D communication needs to be established again. Therefore, how to provide more reliable D2D communications while maintaining continuity of the ProSe service is an important issue for people in the art.

D2D communication in LTE is a promising technology to realize Public Safety (PS) and commercial usage. Based on the scope of "Enhanced LTE Device to Device Proximity Services" in RP-150441, the continuity of ProSe service is considered as an important feature for enhancing D2D communications. Device mobility is one of the factor should be considered, which can affect the performance of continuity of ProSe service. When the ProSe capable UE in D2D communications moves across the cell boundary, the seamless handover is expected to provide the continuity for D2D communications service. However, a conventional LTE handover procedure is unable to support the continual ProSe service of D2D communications. For the purpose of handover with signalling minimization in the in-coverage scenario, how to provide the continuity for the ProSe service is challenging.

In addition, when ProSe capable UEs camping on different cells intend to perform D2D communications, the cross-cell D2D connection happens because they are geographically in proximity. There are two cases causing the situation of cross-cell D2D connection. FIG. 1a-1b are schematic diagrams illustrating the different cases of a conventional cross-cell D2D connection. In the first case, the ProSe capable UEs (i.e., UEs 110 and 120 as shown in FIG. 1a) originally camping on different cells (i.e., evolved node Bs (eNBs) 130 and 140 as shown in FIG. 1a). A cross-cell D2D communications should be enabled so that these ProSe capable UEs can directly communicate with each other, as shown in FIG. 1a. In the second case, as illustrated in FIG. 1b, the ProSe capable UEs (i.e., the UEs 110 and 120 as shown in FIG. 1b) perform ongoing D2D communications in the same cell at first. Due to mobility, one of the ProSe capable UE (i.e., the UE 120) may be handed over to its neighboring cell. Therefore, the D2D communications link may be interrupted, and then the moving ProSe capable UE (i.e., the UE 120) is handed over to the neighboring cell (i.e., the eNB 140). D2D communications is again established. That is, the second case can be viewed as the cross-cell D2D communications after a traditional handover procedure. However, the current solution to the second case may not be efficient since there is extra control signalling to provide the continuity for D2D communication service.

Considering the basic Rel-12 handover scenario in the radio access network, LTE handover can be divided into five phases. The five phases include measurement, handover decision, handover preparation, handover execution and handover completion. The basic Rel-12 handover scenario in the radio access network will be described with reference to Table 1, which indicates the handover related procedures.

TABLE 1

| Procedure | Direction or Related Entities | Description |
|---|---|---|
| Measurement Configuration | eNB → UE | Specifies measurements to be performed by the UE |
| Measurement Report | UE → eNB | indicates measurement results |
| Handover Decision | source eNB | Makes decisions on target eNBs and handover types (X2 or S1 handover) |
| Handover Preparation | Varies depending on a handover type | Prepares forwarding path |
| Handover Execution | | Forwards data |
| Handover Completion | | Switches data path |

Referring to Table 1, firstly, multiple eNBs specify measurements to be performed by the UE in Measurement Configuration procedure. Then, the UE measures the signal strength to its serving eNB and neighbor eNBs, and reports the results to the serving eNB, periodically or depending on a triggered measurement event, in Measurement Report procedure. Reporting criteria for Evolved Universal Terrestrial Radio Access (E-UTRA) report include Events A1, A2, A3, A4 and A5. The descriptions of the events used to trigger the LTE handover are as follows, where Event A3 is commonly used in triggering handovers. The descriptions of the events used to trigger the LTE hand over are provided as follows:

A1: The received signal strength from the serving cell becomes better than the threshold A2: The received signal strength from the serving cell becomes worse than the threshold A3: The received signal strength from the neighboring cell becomes offset better than the serving cell A4: The received signal strength from the neighboring cell becomes better than the threshold A5: The received signal strength from the neighboring cell becomes better than the threshold, and the received signal strength from the serving cell becomes worse than the threshold.

As a measurement event is triggered, the UE measures the signal strength to the neighboring cells, and sends a Measurement Report message to its serving eNB (i.e., source eNB).

Next, the handover decision is made by the source eNB based on the measurement report from the UEs in Handover Decision procedure. When the event (i.e., one of the Events A1, A2, A3, A4 and A5) is reported, the source eNB decides what kind of handover to perform so as to switch to the target eNB, and then initiates a handover procedure. It is noted that the complete handover process may be categorized into many different types, and the type of X2 handover would be discussed herein. The X2 interface connects two eNBs (e.g., the source eNB and the target eNB). If there is an X2 connection between the source eNB and the target eNB, the X2 connection is available for handover, such that the X2 handover would be initiated. Once the handover is completed, the source eNB and the target eNB communicate with each other to control the handover without the interventions of the mobility management entity (MME).

Handover Preparation phase starts when the source eNB issues the handover request message to the target eNB. During this phase, the source eNB and the target eNB prepare for a handover. The source eNB sends the user's UE context (i.e., security context, quality of service (QoS) context, etc.) to the target eNB to check whether the target eNB is capable of providing the satisfactory service quality. If yes, the target eNB establishes a transport bearer (e.g., downlink (DL) packet forwarding bearer) for packet forwarding. Then, the target eNB allocates cell radio network temporary identifier (C-RNTI) value used by the UE to access the target eNB, and forwards the same information to the source eNB via X2 interface. Thus, the preparation phase is completed. At this time, the DL packet forwarding bearer forms a direct tunnel connecting the source eNB and the target eNB in X2 handover.

After that, the source eNB instructs the UE to perform a handover to the target eNB by sending a handover command message which includes all the information used to access the target eNB in Handover Execution procedure. In addition, the source eNB informs the target eNB which UL/DL packet should be received or sent by sending a sequence number (SN) status transfer message to the target eNB. The source eNB forwards the DL packets received from the Serving Gateway (S-GW) to the target eNB through the X2 transport bearer established between the source eNB and the target eNB. So the UE detaches from the source eNB and accesses to the target eNB. The target eNB becomes capable of sending and receiving packets once the UE has successfully accessed.

During the handover completion phase, the target eNB sends a path switch request message to the MME to inform that the UE has changed to attach to the target eNB. Once the UE completes its radio access to the target eNB successfully, the UE's bearer path (DL S1 bearer) is now connected to the target eNB rather then the source eNB. The MME informs the target eNB that the DL S1 bearer path has been modified. The target eNB sends a UE context release message to the source eNB, wherein the UE context release message includes the information of allowing the source eNB to release the resource.

Although the modification of the D2D communications handover must be done in respect to LTE handover, while it also needs to be backward compatible. In addition, since the D2D communications handover method for the problem of signalling minimization is not yet decided, how to provide more reliable D2D communications while maintaining continuity for the ProSe service is also an important issue. Though 3GPP has not yet specified this issue, it can be significant to support future D2D communications.

SUMMARY OF THE INVENTION

The disclosure provides a method of performing a handover procedure and a method of making a handover decision for device-to-device communications and a control node thereof, by which the ProSe capable UEs in D2D communications can be handed over from a source eNB to a target eNB together or successively to provide more reliable D2D communications and maintain the ProSe service continuity support.

According to at least one embodiment of the disclosure, a method of performing a handover procedure for D2D communications applicable to a first control node serving a D2D communication between a first UE and a second UE is provided. The method includes: determining that one of the first UE and the second UE needs to be handed over or both of the first UE and the second UE need to be handed over based on measurement reports from the first UE and the second UE; transmitting a handover request to a second control node if the first control node determines that both of the first UE and the second UE need to be handed over to the second control node; receiving a handover request acknowledgement from the second control node after the second control node configuring a first resource for the first UE and the second UE to perform the D2D communication, wherein the handover request acknowledgement is used to inform the first control node that the second control node is able to serve the D2D communication; and transmitting a handover command to the first UE and the second UE to indicate the first UE and the second UE to detach from the first control node and synchronize to the second control node.

According to at least one embodiment of the disclosure, a control node adapted to serve a D2D communication between a first UE and a second UE is provided. The control node includes a communication circuit, a storage circuit and a processor. The storage circuit stores a plurality of modules. The processor is coupled to the communication circuit and the storage circuit and is configured to access and execute the modules stored by the storage unit. The modules include a handover determining module, a handover request transmitting module, an acknowledgement receiving module and a command transmitting module. The handover determining module determines that one of the first UE and the second UE needs to be handed over or both of the first UE and the second UE need to be handed over based on measurement reports from the first UE and the second UE. The handover request transmitting module controls the communication circuit to transmit a handover request to another control node if the control node determines that both of the first UE and the second UE need to be handed over to the another control node. The acknowledgement receiving module controls the communication circuit to receive a handover request acknowledgement from the another control node after the another control node configuring a first resource for the first UE and the second UE to perform the D2D communication, wherein the handover request acknowledgement is used to inform the control node that the another control node is able to serve the D2D communication. The command transmitting module controls the communication circuit to transmit a handover command to the first UE and the second UE to indicate the first UE and the second UE to detach from the control node and synchronize to the another control node.

According to at least one embodiment of the disclosure, a method of performing a handover procedure for D2D communications applicable to a first control node serving a D2D communication between a first UE and a second UE is provided. The method includes: determining that one of the first UE and the second UE needs to be handed over or both of the first UE and the second UE need to be handed over based on measurement reports from the first UE and the second UE; transmitting a handover request to a second control node if the first control node determines that the first UE needs to be handed over to the second control node; receiving a handover request acknowledgement from the second control node after the second control node configuring a first resource for the first UE and the second UE to perform the D2D communication, wherein the handover request acknowledgement is used to inform the first control node that the second control node is able to serve the D2D communication; and transmitting a handover command to the first UE to indicate the first UE to detach from the first control node and synchronizes to the second control node.

According to at least one embodiment of the disclosure, a control node adapted to serve a D2D communication between a first UE and a second UE is provided. The control node includes a communication circuit, a storage circuit and a processor. The storage circuit stores a plurality of modules. The processor is coupled to the communication circuit and the storage circuit and is configured to access and execute the modules stored by the storage unit. The modules include a handover determining module, a handover request transmitting module, an acknowledgement receiving module and a command transmitting module. The handover determining module determines that one of the first UE and the second UE needs to be handed over or both of the first UE and the second UE need to be handed over based on measurement reports from the first UE and the second UE. The handover request transmitting module controls the communication circuit to transmit a handover request to another control node if the control node determines that the first UE needs to be handed over to the another control node. The acknowledgement receiving module controls the communication circuit to receive a handover request acknowledgement from the another control node after the another control node configuring a first resource for the first UE and the second UE to perform the D2D communication, wherein the handover request acknowledgement is used to inform the control node that the another control node is able to serve the D2D communication. The command transmitting module controls the communication circuit to transmit a handover command to the first UE to indicate the first UE to detach from the control node and synchronizes to the another control node.

According to at least one embodiment of the disclosure, a method of making a handover decision for D2D communications applicable to a first control node serving a D2D communication between a first UE and a second UE is provided. The method includes: requesting the first UE and the second UE to report measurement reports; receiving the measurement reports from the first UE and the second UE; and determining that one of the first UE and the second UE needs to be handed over, both of the first UE and the second UE need to be handed over, or none of the first UE and the second UE need to be handed over based on the measurement reports.

According to at least one embodiment of the disclosure, a control node adapted to make a handover decision for D2D communications between a first UE and a second UE is provided. The control node includes a communication circuit, a storage circuit and a processor. The storage circuit stores a plurality of modules. The processor is coupled to the communication circuit and the storage circuit and is configured to access and execute the modules stored by the storage unit. The modules include a measurement request module, a measurement receiving module and a determining module. The measurement request module controls the communication circuit to request the first UE and the second UE to report measurement reports. The measurement receiving module controls the communication circuit to receive the measurement reports from the first UE and the second UE. The determining module determines that one of the first UE and the second UE needs to be handed over, both of the first UE and the second UE need to be handed over, or none of the first UE and the second UE need to be handed over based on the measurement reports.

To sum up, embodiments in the disclosure propose a method of performing a handover procedure, a method of making a handover decision for D2D communications and a control node. In the method of making a handover decision, the control node determines whether one or both of the UEs performing D2D communication need to be handed over based on their measurement reports. If both of the UEs need to be handed over, the UEs can handover from the source control node to the target control node together, reducing extra information exchange. If one of the UEs needs to be handed over, the control node allows the UE to hand over seamlessly in short time, providing the ProSe service continuity enhancement.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
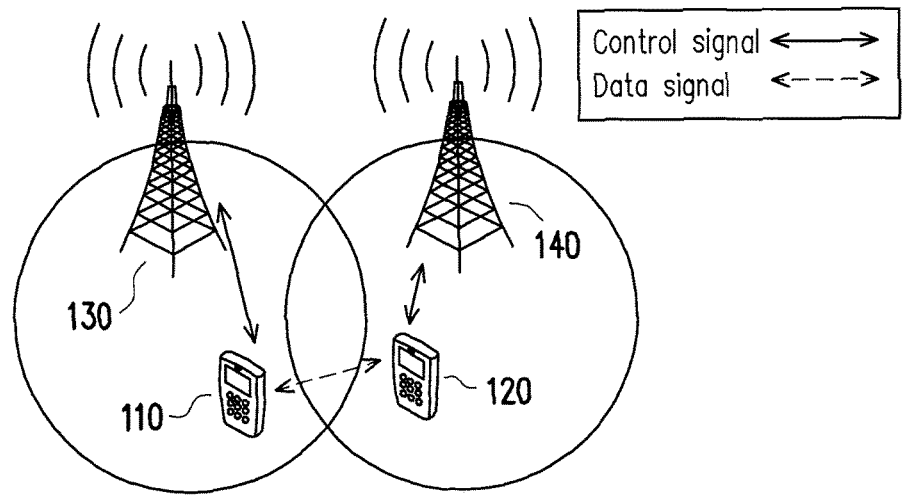
FIG. 1a-1b are schematic diagrams illustrating the different situations of cross-cell D2D connection.
Figure 1B:
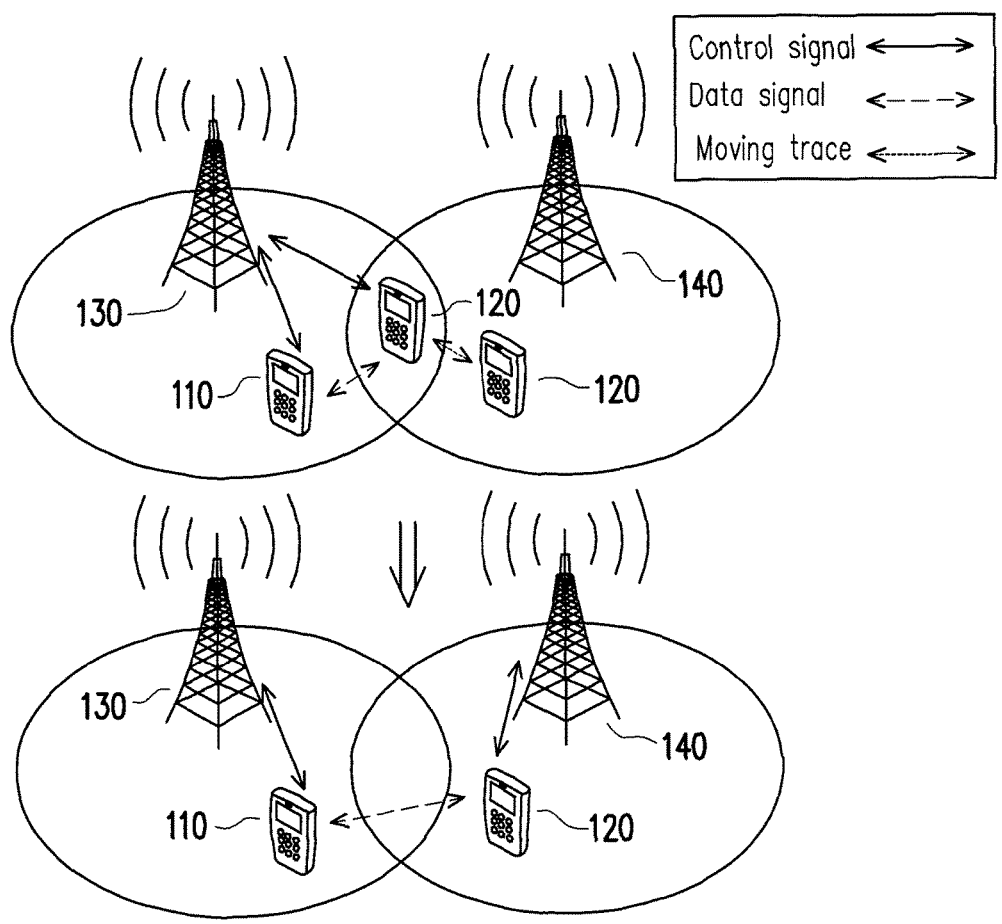

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The term "coupling/coupled" used in this specification (including claims) may refer to any direct or indirect connection means. For example, "a processor is coupled to a communication circuit and a storage circuit" should be interpreted as "the processor is directly connected to the communication circuit and the storage circuit" or "the processor is indirectly connected to the communication circuit and the storage circuit through other devices or connection means." Moreover, wherever appropriate in the drawings and embodiments, elements/components/steps with the same reference numerals represent the same or similar parts. Elements/components/steps with the same reference numerals or names in different embodiments may be cross-referenced.

Figure 2:
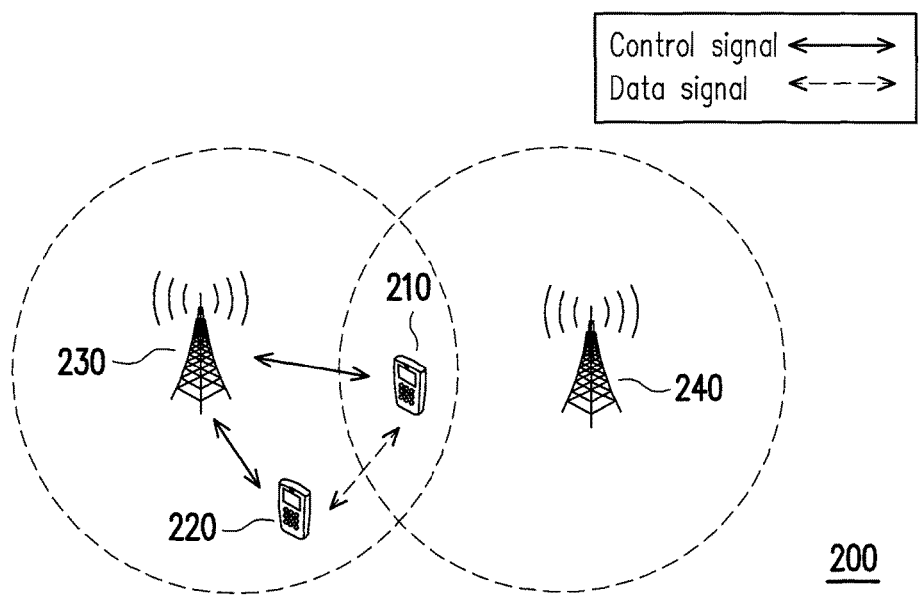
FIG. 2 is a schematic diagram illustrating a wireless communication system for D2D communication according to an embodiment of the disclosure.

FIG. 2 is a schematic diagram illustrating a wireless communication system for D2D communication according to an embodiment of the disclosure. The wireless communication system 200 includes UEs 210, 220 and control nodes 230, 240. It should be noted that although FIG. 2 merely illustrates two UEs 210, 220 and two control nodes 230, 240 as an example, but the disclosure could be generalized to more UEs and control nodes.

In the present embodiment, the UEs 210, 220 may be presented as various implementations, which may (but not limited to) include, for example, a mobile station, an advanced mobile station (AMS), a server, a user terminal, a notebook computer, a network computer, a workstation, a personal digital assistant (PDA), a phone device, a pager, a camera, a television, a handheld video game device, a wireless sensor, etc.

Further, the UEs 210, 220 according to embodiments of the disclosure may be ProSe capable UEs. That is to say, the UE 210, 220 may be any nodes or devices that can perform the ProSe direct communication with each other, such as vehicular to vehicular, machine to machine, device to device, vehicular to infrastructure, and so on. Since a D2D pair represents ProSe capable UEs communicating with each other, it would be used to stand for the UEs 210 and 220 that directly communicate with each other in the disclosure.

The control nodes 230 and 240 may be presented as various implementations, which may (but not limited to) include, for example, an eNB, a home eNB (HeNB), an advanced base station (ABS), a base transceiver system (BTS), an access point, a home base station, a relay, a scatterer, a repeater, an intermediate node, an intermediary and/or a satellite-based communication base station.

In the present embodiment, it is assumed that the control node 230 is a source control node which is serving D2D communications between the UEs 210 and 220, and the control node 240 is a target control node which may be an adjacent cell that the UE 210 and the UE 220 intend to perform D2D communications, but the feasible embodiments of the disclosure are not limited thereto.

Figure 3:
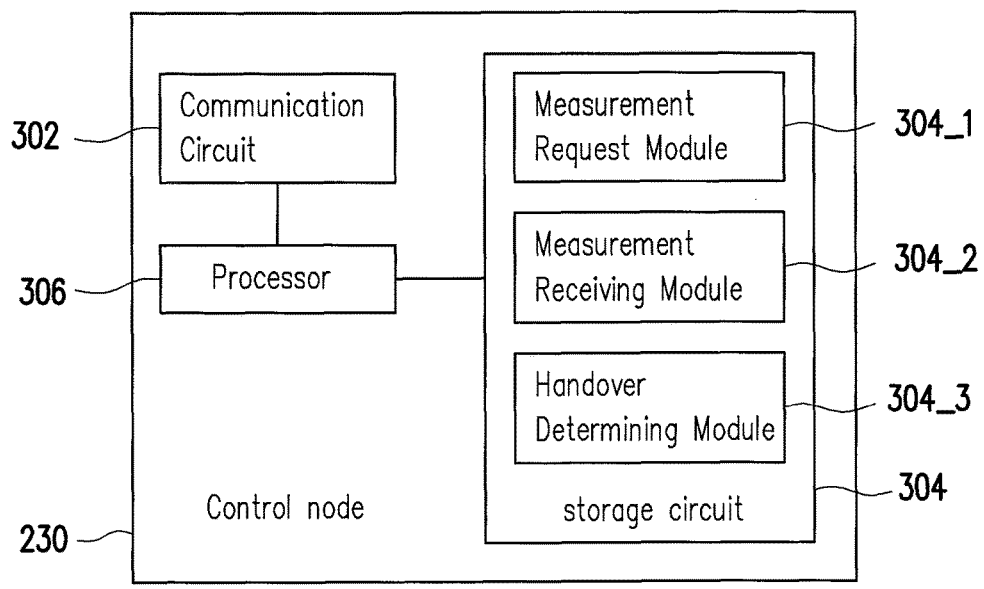
FIG. 3 is a block diagram illustrating the control node according to an embodiment of the disclosure.

The control node 230 may be represented by at least the functional elements as illustrated in FIG. 3. FIG. 3 is a block diagram illustrating the control node according to an embodiment of the disclosure. The control node 230 may at least (but not limited to) include a communication circuit 302, storage circuit 304, and a processor 306. The communication circuit 302 may include a transmitter circuit, an analog-to-digital (A/D) converter, a D/A converter, a low noise amplifier (LNA), a mixer, a filter, a matching circuit, a transmission line, a power amplifier (PA), one or more antenna circuits and local storage media components (but the disclosure is not limited thereto) for provide wireless transmission/receiving functions to the control node 230. The storage circuit 304 may be, for example, a memory, a hard disk drive or any other element used for storing data and may be configured to record a plurality of program codes or modules.

The processor 306 is coupled to the communication circuit 302 and the storage circuit 304 and may be a general purpose processor, a specific purpose processor, a conventional processor, a digital signal processor (DSP), a plurality of microprocessors, one or more microprocessors integrated with a DSP core, a controller, a micro-controller, an application specific integrated circuit (ASIC), a field programmable gate array (FPGA), any other type of integrated circuit, a state machine, an advanced RISC machine-based processor or the like. The implementation of the control node 240 could be similar to the control node 230, which would not be repeated herein.

Figure 4:
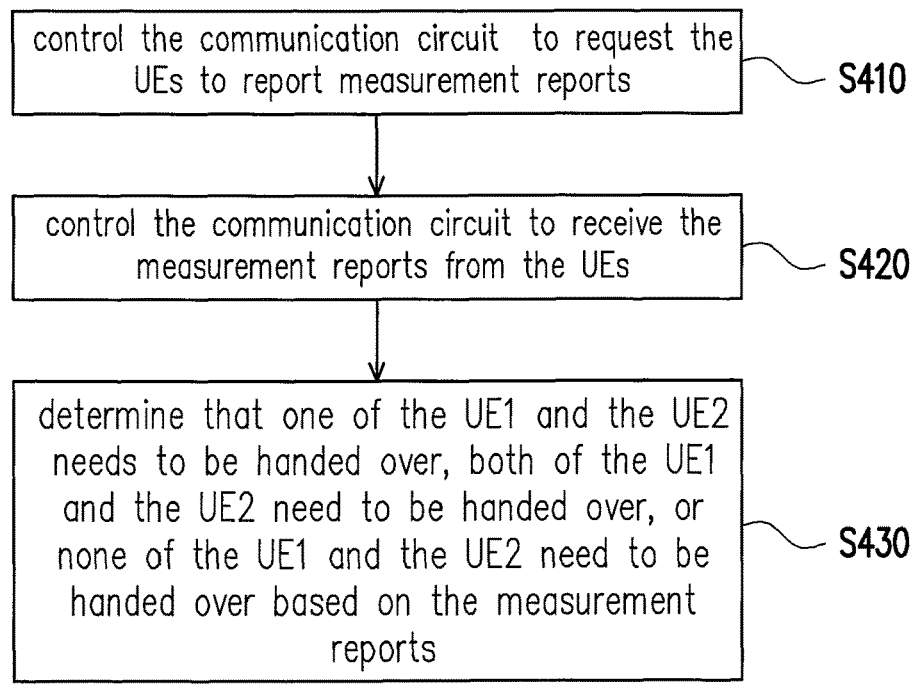
FIG. 4 is a flowchart illustrating a method of making a handover decision in the handover procedure for D2D communications according to an embodiment of the disclosure.

In the present embodiment, the processor 306 may make a handover decision in a handover procedure by accessing and executing a measurement request module 304_1, a measurement receiving module 304_2 and a handover determining module 304_3 in the storage circuit 304. Referring to FIG. 4, FIG. 4 is a flowchart illustrating a method of making a handover decision in the handover procedure for D2D communications according to an embodiment of the disclosure. The method of the present embodiment may be performed by the control node 230 in FIG. 2, and each step of the method will be described with reference to each element depicted in FIG. 3.

Firstly, in step S410, the measurement request module 304_1 may control the communication circuit 302 to request the UE 210 and the UE 220 to report measurement reports. In the present embodiment, the measurement request module 304_1 may control the communication circuit 302 to send a measurement request to the UE 210 and the UE 220 by Multicast Control Channel (MCCH) or Dedicated Control Channel (DCCH). The reason is that the UEs 210 and 220 can use the same context and message. The measurement request indicates the required measurement information, which includes assigning the D2D measurement identification (ID) and a measurement list, and reporting the configuration and measurement gap for the UE 210 and the UE 220, but the disclosure is not limited thereto.

The D2D Measurement ID is a D2D specific ID to find D2D groups or pairs. The D2D measurement ID can be group-based or unicast-based. The D2D measurement ID is used to identify measurement objects, to which the UE should measure its radio signal quality. The UEs 210 and 220 use the D2D measurement ID to measure the radio signal quality (e.g., reference signal receiving power (RSRP) and/or reference signal receiving quality (RSRQ)) of target control nodes respectively. In the present embodiment, when it comes to the handover of D2D communications, the UE 210 and 220 would not only measure the radio signal quality to the control node 240, but also the radio signal quality to the corresponding UE among its ongoing D2D communications. That is, D2D pair or D2D group should be assigned a new ID to measure the radio signal quality of the D2D communications among each other. The new ID would be referred as a D2D measurement ID, which identifies the UE 210 and the UE 220 to measure a radio signal quality of the D2D communications between the UE 210 and the UE 220.

The measurement list may include measurement objects specified by the IDs of control nodes, providing information about the control nodes in wireless communication system 200 to be measured by the UE 210 and the UE 220. It is noted that the IDs of the control nodes may be the addresses of the control nodes, but the disclosure is not limited thereof. The information about the control nodes may include frequency channel number, Physical Cell ID (PCI) of the control nodes to be measured, etc. In the present embodiment, the measurement list at least includes the IDs of the control node 230 (i.e., source control node) and the control node 240 (i.e., target control node). The measurement list may also include IDs of other control nodes adjacent to the control node 230 or 240.

In some embodiments, the measurement objects included in the measurement list could vary according to the Public Land Mobile Networks (PLMNs) which the UEs 210 and 220 belong to.

In a first embodiment, it is assumed that the UEs 210 and 220 belong to the same PLMN (i.e., the UEs 210 and 220 are served by the same telecommunication operator). Under this situation, the UEs 210 and 220 may be regard as performing an intra-PLMN communication. Since the UEs 210 and 220 belong to the same PLMN, the control node 230 could arrange the measurement objects to be the control nodes belonging to the PLMN same as the UEs 210 and 220, such that the measurement lists sent to the UEs 210 and 220 are the same.

In a second embodiment, it is assumed that the UEs 210 and 220 belong to different PLMNs (i.e., the UEs 210 and 220 are served by different telecommunication operators). Under this situation, the UEs 210 and 220 may be regard as performing an inter-PLMN communication. Generally, the UE 210 or 220 would not measure the radio signal quality to the control nodes belonging to different PLMNs. That is, the UE 210 or 220 always measures the radio signal quality to the control nodes belonging to the same PLMN. However, this may interrupt the D2D communication between the UEs 210 and 220 when one or both of the UEs 210 and 220 are handed over, such that the service continuity requirement may not be fulfilled.

For dealing with this problem, in the second embodiment, the control node 230 may modify the measurement list to allow the UEs 210 and 220 to further measure the radio signal quality to the control node which its corresponding UE will be handed over to that belongs to different PLMNs. Hence, the measurement list may contain the IDs of the control nodes that belong to different PLMNs. For example, if the UE 210 will be handed over to one of control nodes A, B and C, and the UE 220 will be handed over to one of control nodes D, E and F, wherein the control nodes A, B and C belong to operator 1 and the control nodes D, E and F belong to operator 2. The control node 230 may arrange the measurement objects in the measurement list that contains IDs of the control nodes A, B, C, D, E and F, and send the measurement list to both of the UEs 210 and 220. As a result, when the D2D pair moves out of the coverage of the control node 230 and are handed over to control nodes belonging to different PLMNs, the D2D communication would not be interrupted, and hence the service continuity requirement could be fulfilled.

Referring back to FIG. 4, in step S420, the measurement receiving module 304_2 may control the communication circuit 302 to receive the measurement reports from the UEs 210 and 220. In the present embodiment, the measurement reports may include a first measurement report from the UE 210 and a second measurement report from the UE 220. The first measurement report includes the radio signal quality of the D2D communication between the UE 210 and the UE 220, a first radio signal quality between the UE 210 and the control node 230, and a second radio signal quality between the UE 210 and the control node 240. The second measurement report includes the radio signal quality of the D2D communication between the UE 210 and the UE 220, a third radio signal quality between the UE 220 and the control node 230, and a fourth radio signal quality between the UE 220 and the control node 240. It is noted that the radio signal quality may include RSRP, RSRQ, and/or the like, but the disclosure is not limited thereto. For facilitating the following discussions, the RSRP would be used to exemplarily represent the radio signal quality.

In some embodiments, there may be two ways for the UE 210 and the UE 220 to report the measurement reports. One approach is that the UE 210 and the UE 220 respectively report the first measurement report and the second measurement to the control node 230. Another approach is that the UE 210 sends the first measurement report to the UE 220, and the UE 220, as a relay node, sends the first measurement report concurrent with its second measurement report to the control node 230. But no matter how the UE 210 and the UE 220 report the measurement reports to the control node 230, the UE 210 and the UE 220 may report the measurement reports to the control node 230 periodically or by events through DCCH. The reason is that the UE 210 and the UE 220 use the same context information and message with the control node 230.

In step S430, the handover determining module 304_3 determines that one of the UEs 210 and 220 needs to be handed over, both of the UEs 210 and 220 need to be handed over, or none of the UEs 210 and 220 need to be handed over based on the measurement reports.

In the present embodiment, when the UEs 210 and 220 in ongoing D2D communications move across boundary of the control node 230, the seamless handover is expected to provide the service continuity. Both of the UEs 210 and 220 need to be handed over to the control node 240 to maintain the service continuity. For facilitating the following discussion, the handover procedure performed after determining that both of the UEs 210 and 220 need to be handed over may be referred as a joint handover procedure, but the disclosure is not limited thereto. On the other hand, if the UE 210 and 220 perform handover to neighbouring cell successively or only one of the UE 210 and 220 performs the handover to the neighbouring cell, the handover procedures correspondingly performed may be referred as a half handover procedure, but the disclosure is not limited thereto.

In one embodiment, the handover determining module 304_3 may perform step S430 based on several variables, e.g., Handover Margin (HOM), Time to Trigger (TTT) timer, LTE threshold, D2D threshold and Time to Trigger of D2D ($TTT_D$). The value of those variables to different devices can be different. A HOM is a constant variable that represents a threshold of the difference between the received radio signal quality to the source control node and the received radio signal quality to the target control node. The HOM ensures the target control node is the most appropriate control node which the UE handed over to. A TTT value is the time interval that is required to satisfy HOM condition. Both HOM and TTT are used for reducing unnecessary handovers which is called "Ping-Pong effect." When the UE is experiencing this effect, it hands over from the source control node to the target control node and hands back to the original source control node again in a short period of time. This effect increases the required signalling resources, decreases system throughput, and increases data traffic delay caused by buffering the incoming traffic at the target control node when each handover occurs. Therefore, it is essential to effectively avoid unnecessary handovers. The TTT restricts the handover action from being triggered within a certain time duration. A handover procedure can only be performed after the TTT condition has been satisfied.

Figure 5:
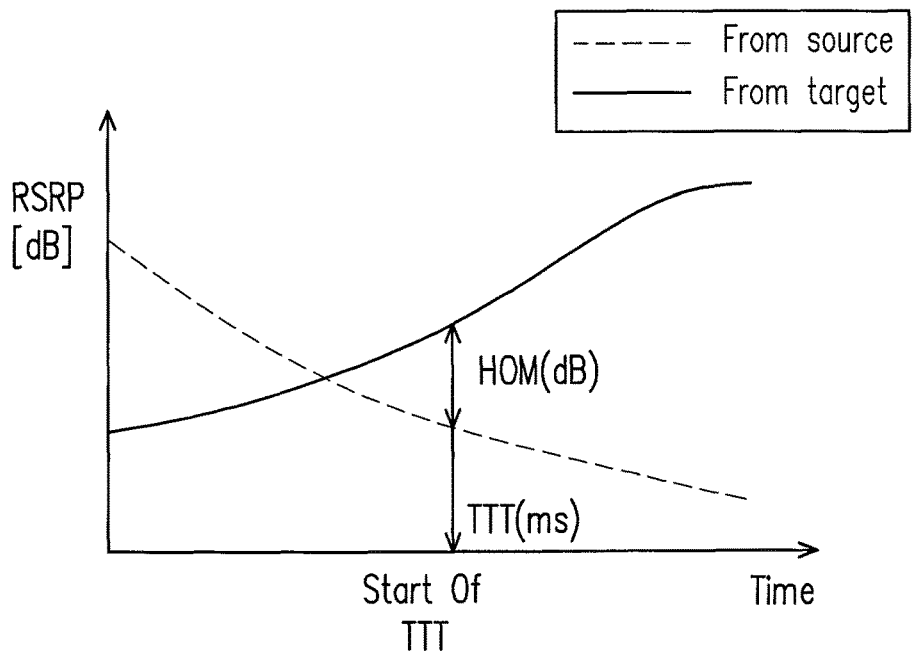
FIG. 5 is a schematic diagram illustrating radio signal quality received from source control node and target control node respectively according to an embodiment of the disclosure.

FIG. 5 is a schematic diagram illustrating radio signal quality received from the source control node and the target control node respectively according to an embodiment of the disclosure. The concept of HOM and TTT for D2D communications can be illustrated by the FIG. 5. Please also refer to FIG. 2 for better understanding. Referring to FIG. 5, the RSRP in dB (unless specified in dBm or dBW) is the radio signal quality in wireless communication system in the present embodiment. The radio signal quality represented as "From source" exemplarily shows the RSRP of the UE 210 receives from the control node 230. The radio signal quality represented as "From target" exemplarily shows the RSRP of the UE 210 receives from the control node 240.

In FIG. 5, when the UE 210 is moving away from the control node 230, the RSRP which the UE 210 receives from the control node 230 will degrade as the time increases. In the meanwhile, the UE 210 may move towards the control node 240, thus the RSRP of the UE 210 receives from the control node 240 will increase as the time increases. In the present embodiment, a handover is triggered when the triggering condition (1) and (2) are both satisfied, followed by the handover command.

$$RSRP_T > RSRP_S + HOM \quad (1)$$

$$HO\ Trigger > TTT \quad (2),$$

where $RSRP_T$ and $RSRP_S$ are the RSRP received from the control node 240 (i.e., target control node) and the control node 230 (i.e., source control node) respectively, HOM is a constant variable that represents a threshold of the difference between the received RSRP to the control node 230 and the received RSRP to the control node 240, TTT value is the time interval that is required to satisfy HOM condition and HO Trigger is the handover trigger timer which starts counting when equation (1) gets satisfied.

An LTE Threshold ($LTE_{Th}$) is a constant variable that represents whether the UE can be provided qualified connection from the source control node. If the RSRP from the source control node is greater than the $LTE_{Th}$, the source control node can continue to serve the UE. In contrast, if the RSRP from the source control node is less than the $LTE_{Th}$, the source control node is not qualified to serve the UE anymore.

A D2D Threshold ($D2D_{Th}$) is used to evaluate the radio signal quality of the D2D signal. A D2D Trigger is the D2D radio signal quality timer which starts counting when one of the UEs in D2D communications triggers the handover. If the radio signal quality of the D2D communications in the D2D pair is greater than the $D2D_{Th}$ during D2D Trigger, the D2D pair may be in geographical proximity. On the other hand, if the radio signal quality of the D2D communications in the D2D pair is less than the $D2D_{Th}$ during D2D Trigger, the D2D pair may be moving away from each other. When the UEs in D2D communications are moving away from each other, the radio signal quality of the D2D communications in the D2D pair will degrade as the time increases. In the present embodiment, a handover is also triggered when the triggering condition (3) and (4) are both satisfied, followed by the handover command.

$$D2D\ signal > D2D_{Th} \quad (3)$$

$$D2D\ Trigger > TTT_D \quad (4)$$

, where D2D signal is the radio signal quality of the D2D communications in the D2D pair, D2D Trigger is the timer which starts counting when equation (3) gets satisfied, and $TTT_D$ is the time interval that is required to satisfy D2D condition.

As described above, these variables (i.e., HOM, TTT, $LTE_{Th}$, $D2D_{Th}$ and $TTT_D$) could be used by the handover determining module 304_3 in step S430. In the following section, details of step S430 would be discussed with reference to FIG. 6.

Figure 6:
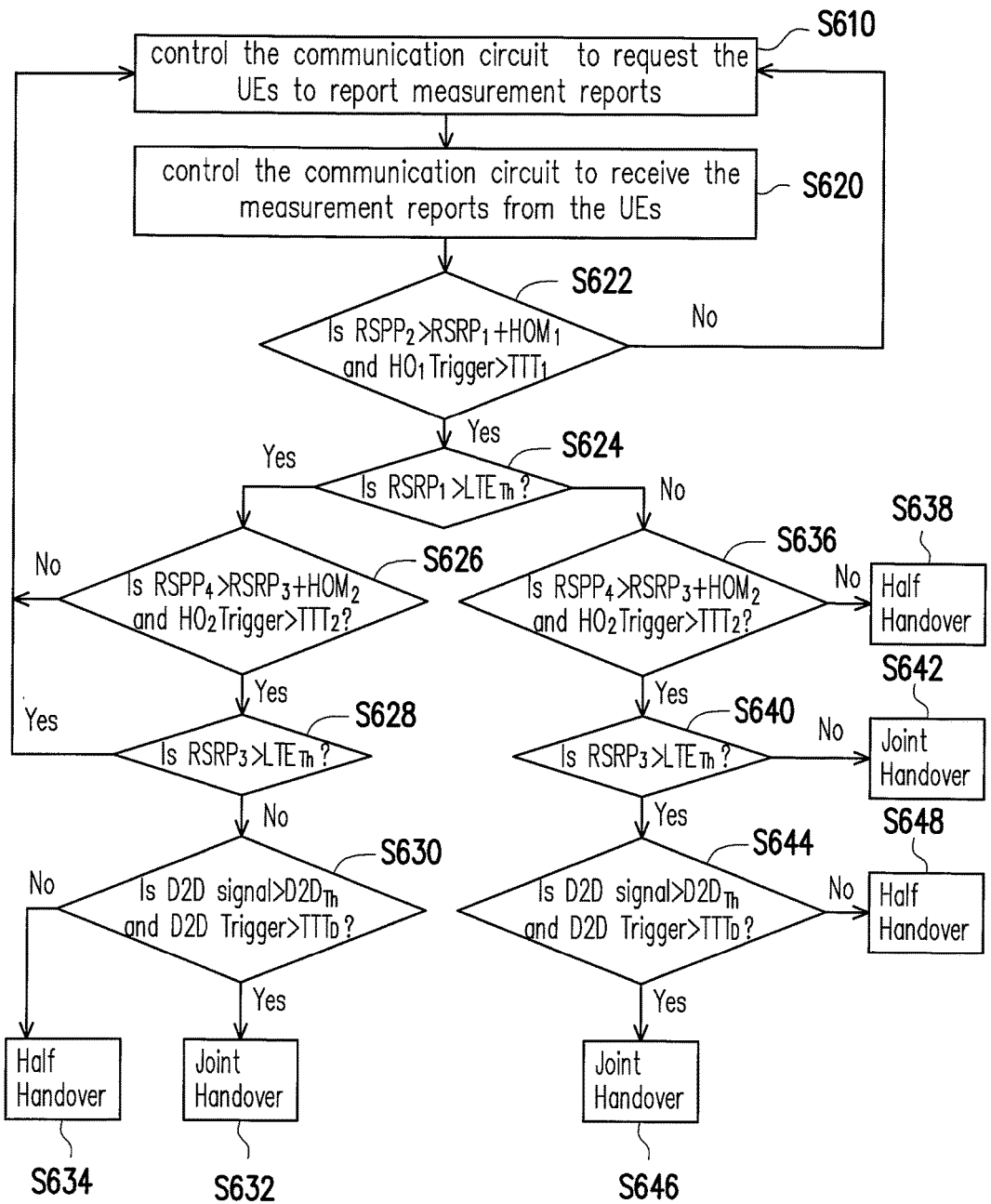
FIG. 6 is a flowchart illustrating a method of making a handover decision in a handover procedure for D2D communications according to the embodiment depicted in FIG. 4.

FIG. 6 is a flowchart illustrating a method of making a handover decision in a handover procedure for D2D communications according to the embodiment depicted in FIG. 4. In the present embodiment, details with respect to steps S610 and S620 may refer to steps S410 and S420 in FIG. 4 and will not be repeated hereinafter.

In step S622, the handover determining module 304_3 may determine whether the second radio signal quality is greater than a sum of the first radio signal quality and a first HOM, and a first handover trigger is greater than a first TTT. In the present embodiment, the handover determining module 304_3 may determine whether the UE 210 needs to be handed over firstly, but the disclosure is not limited thereto. In other words, the handover determining module 304_3 may also determine whether the UE 220 needs to be handed over firstly in other embodiments. In step S622, since the radio signal quality is characterized as RSRP in the present embodiment, the triggering conditions in step S622 are expressed as:

$$RSRP_2 > RSRP_1 + HOM_1, \quad (6\text{-}1)$$

$$HO_1\ Trigger > TTT_1 \quad (6\text{-}2)$$

wherein $RSRP_2$ (i.e., the second radio signal quality) is the RSRP between the UE 210 and the control node 240, $RSRP_1$ (i.e., the first radio signal quality) is the RSRP between the UE 210 and the control node 230, $HOM_1$ is a threshold of the difference between the received RSRP to the control node 230 and the received RSRP to the control node 240 for the UE 210, $HO_1$ Trigger is the handover trigger timer which starts counting when equation (6-1) gets satisfied and $TTT_1$ is the time interval that is required to satisfy the condition of $HOM_1$.

If, in step S622, any one of the equation (6-1) or (6-2) does not get satisfied, the handover determining module 304_3 does not trigger the handover. Thus, the handover determining module 304_3 may return to step S610. On the other hand, if both of the equations (6-1) and (6-2) get satisfied in step S622, the UE 210 satisfies the handover condition. Thus, in step S624, the handover determining module 304_3 may further determine whether the first radio signal quality is greater than a system threshold, which is expressed as:

$$RSRP_1 > LTE_{Th} \quad (6\text{-}3)$$

wherein $RSRP_1$ is the RSRP between the UE 210 and the control node 230, and $LTE_{Th}$ is a constant variable.

If, in step S624, the equation (6-3) gets satisfied, it represents that both the control node 230 and the control node 240 are good enough to support the basic service for the UE 210. Thus, the handover determining module 304_3 may, in step S626, continue to determine whether the UE 220 satisfies the handover conditions by determining whether the fourth radio signal quality is greater than a sum of the third radio signal quality and a second HOM, and a second handover trigger is greater than a second TTT, which are expressed as:

$$RSRP_4 > RSRP_3 + HOM_2, \quad (6\text{-}4)$$

$$HO_2\ Trigger > TTT_2 \quad (6\text{-}5)$$

wherein $RSRP_4$ (i.e., the fourth radio signal quality) is the RSRP between the UE 220 and the control node 240, $RSRP_3$ (i.e., the third radio signal quality) is the RSRP between the UE 220 and the control node 230, $HOM_2$ is a threshold of the difference between the received RSRP to the control node 230 and the received RSRP to the control node 240 for the UE 220, $HO_2$ Trigger is the handover trigger timer which starts counting when equation (6-4) gets satisfied and $TTT_2$ is the time interval that is required to satisfy the condition of $HOM_2$.

If, in step S626, any one of the equation (6-4) or (6-5) does not get satisfied, the handover determining module 304_3 would not trigger the handover. In this situation, it represents that the control node 230 is still good enough to support the basic service for the UEs 210 and 220. Thus, the handover determining module 304_3 may return to step S610.

If, in step S626, both of the equation (6-4) and (6-5) get satisfied, the UE 220 satisfies the handover condition. Thus, in step S628, the handover determining module 304_3 may further determine whether the third radio signal quality is greater than the system threshold, which is expressed as:

$$RSRP_3 > LTE_{Th} \quad (6\text{-}6)$$

wherein $RSRP_3$ is the RSRP between the UE 220 and the control node 230, and $LTE_{Th}$ is a constant variable.

If, in step S628, the equation (6-6) gets satisfied, it shows that the control node 230 is still good enough to support the basic service for the UE 220, and hence there is no need to trigger the handover. Therefore, the handover determining module 304_3 may return to step S610.

If, in step S628, the equation (6-6) does not get satisfied, the handover determining module 304_3 may further determine the handover by the radio signal quality of the D2D pair (i.e., the UE 210 and the UE 220). Thus, in step S630, the handover determining module 304_3 may determine whether the radio signal quality in the D2D pair is greater than a D2D threshold, and a D2D trigger greater than a third TTT, which are expressed as:

$$D2D\ signal > D2D_{Th}, \quad (6\text{-}7)$$

$$D2D\ Trigger > TTT_D \quad (6\text{-}8)$$

wherein D2D signal is the radio signal quality of the D2D communication between the UE 210 and the UE 220, $D2D_{Th}$ is a constant variable, D2D Trigger is the timer which starts counting when equation (6-7) gets satisfied, $TTT_D$ is the time interval that is required to satisfy D2D condition.

If, in step S630, both of the equation (6-7) and (6-8) get satisfied, the UE 210 and the UE 220 may be in geographical proximity. Since the UE 210 satisfies the handover condition (i.e., the equation (6-1) and (6-2)) and the UE 220 satisfies the handover condition (i.e., the equation (6-4) and (6-5)), this represents the radio signal quality of the control node 240 is better than the radio signal quality of the control node 230 and the third radio signal quality is below the system threshold (i.e., the equation (6-6)). Under this situation, the control node 230 cannot provide the basic service to the UE 220, and both of the UEs 210 and 220 need to be handed over. Therefore, the handover determining module 304_3 may determine to perform a joint handover procedure in step S632 for the UEs 210 and 220 to perform handover.

If, in step S630, the radio signal quality of the D2D communication between the UE 210 and the UE 220 is below the $D2D_{Th}$, or the radio signal quality of the D2D communication between the UE 210 and the UE 220 is greater than the $D2D_{Th}$ but this phenomenon does not continues longer than the $TTT_D$, the UE 210 and the UE 220 may be moving away from each other. The radio signal quality of the D2D pair will degrade as the time passes by. Since the first radio signal quality (i.e., the RSRP between the UE 210 and the control node 230) is greater than the system threshold, the control node 230 still can provide the basic service to the UE 210. However, since the third radio signal quality (i.e., the RSRP between the UE 220 and the control node 230) is below the system threshold and the UE 220 satisfies the handover condition, the UE 220 must be handed over to the control node 240 to continue the service. However, the UE 210 maybe would not cross the serving cell immediately. Therefore, the handover determining module 304_3 may determine that one of the first UE and the second UE needs to be handed over and perform a half handover procedure in step S634. Then the UEs 210 and 220 would perform the handover successively in the half handover procedure, wherein the UE 220 would perform the handover firstly.

Referring back to step S624, if the equation (6-3) does not get satisfied, this represents that the control node 230 is not good enough to support the basic service for the UE 210. In addition, since the UE 210 satisfies the handover condition in step S622, it also shows that the control node 230 is not qualified to serve the UE 210 anymore, and hence the UE 210 must be handed over to the control node 240. Next, in step S636, the handover determining module 304_3 may determine whether the UE 220 satisfies the handover condition or not. The handover conditions in step S636 is the same as in step S626, which will not be repeated hereinafter.

If, in step S636, any one of the equation (6-4) or (6-5) does not get satisfied, the UE 220 does not need to be handed over because the control node 230 is still good enough to provide the basic service to the UE 220. Therefore, the handover determining module 304_3 may determine that one of the first UE and the second UE needs to be handed over and perform a half handover procedure in step S638. Then the UEs 210 and 220 would perform the handover successively in the half handover procedure, wherein the UE 210 would perform the handover firstly.

If, in step S636, both of the equation (6-4) and (6-5) get satisfied, the UE 220 satisfies the handover conditions. Thus, in step S640, the handover determining module 304_3 may further determine whether the control node 230 can support the basic service for the UE 220. The handover condition in step S640 is the same as in step S628, which will not be repeated hereinafter.

If, in step S640, the equation (6-6) does not get satisfied, it shows that the control node 230 is not good enough to support the basic service for the UE 220 anymore. Since the UE 210 and the UE 220 satisfy the handover conditions in step S622 and step S636 respectively, and the control node 230 is not good enough to support the basic service for both of the UE 210 and the UE 220, the handover determining module 304_3 may determine a joint handover procedure in step S642 for the UEs 210 and 220 to perform the handover.

If, in step S640, the equation (6-6) gets satisfied, the handover determining module 304_3 may further determine the handover by the radio signal quality of the D2D pair in step S644. The handover conditions in step S644 is the same in step S630 described above and will not be repeated hereinafter.

If, in step S644, both of the equation (6-7) and (6-8) get satisfied, the UE 210 and the UE 220 may in geographically close proximity. Since the UE 210 satisfies the handover conditions (i.e., the equation (6-1) and (6-2)) and the UE 220 satisfies the handover conditions (i.e., the equation (6-4) and (6-5)), these represent that the radio signal quality of the control node 240 is above the radio signal quality of the control node 230. Further, since the first radio signal quality is below the system threshold (i.e., the equation (6-3)), the control node 230 cannot provide the basic service to the 210. Under above situations, both of the UEs 210 and 220 need to be handed over. Therefore, the handover determining module 304_3 may determine a joint handover procedure in step S646 for the UEs 210 and 220 to perform the handover.

If, in step S644, the radio signal quality of the D2D communication between the UE 210 and the UE 220 is below the $D2D_{Th}$, or the radio signal quality of the D2D communication between the UE 210 and the UE 220 is greater than the $D2D_{Th}$ but this phenomenon does not continues longer than the $TTT_D$, the UE 210 and the UE 220 may be moving away from each other. The radio signal quality of the D2D pair will degrade as the time passes by. Since the third radio signal quality (i.e., the RSRP between the UE 220 and the control node 230) is greater than the system threshold, the control node 230 is still good enough to provide the basic service to the UE 220. However, since the first radio signal quality (i.e., the RSRP between the UE 210 and the control node 230) is below the system threshold and the UE 210 satisfies the handover condition, the UE 210 must be handed over to the control node 240 to continue the service. However, the UE 220 maybe would not cross the serving cell immediately. Therefore, the handover determining module 304_3 may determine that one of the first UE and the second UE needs to be handed over and perform a half handover procedure in step S648. And the UEs 210 and 220 would perform the handover successively in the half handover procedure, wherein the UE 210 would perform the handover firstly.

In short, in the method of making a handover decision for D2D communications proposed by the embodiments of the disclosure, the control node can make a handover decision based on various triggering conditions. In addition, the control node can determine a handover procedure suitable for the ProSe capable UEs in ongoing D2D communications, so as to provide the ProSe service continuity.

Moreover, in the following section, the method of performing a handover procedure for D2D communications after making a handover decision will be introduced. As mentioned before, the source control node serving the D2D communication for the UEs may determine to hand over the UEs to the target control node through the joint handover procedure or the half handover procedure. The way that the source control node performing handover procedure with the target control node would be exemplarily assumed to be X2 handover, but the disclosure is not limited thereto.

Figure 7:
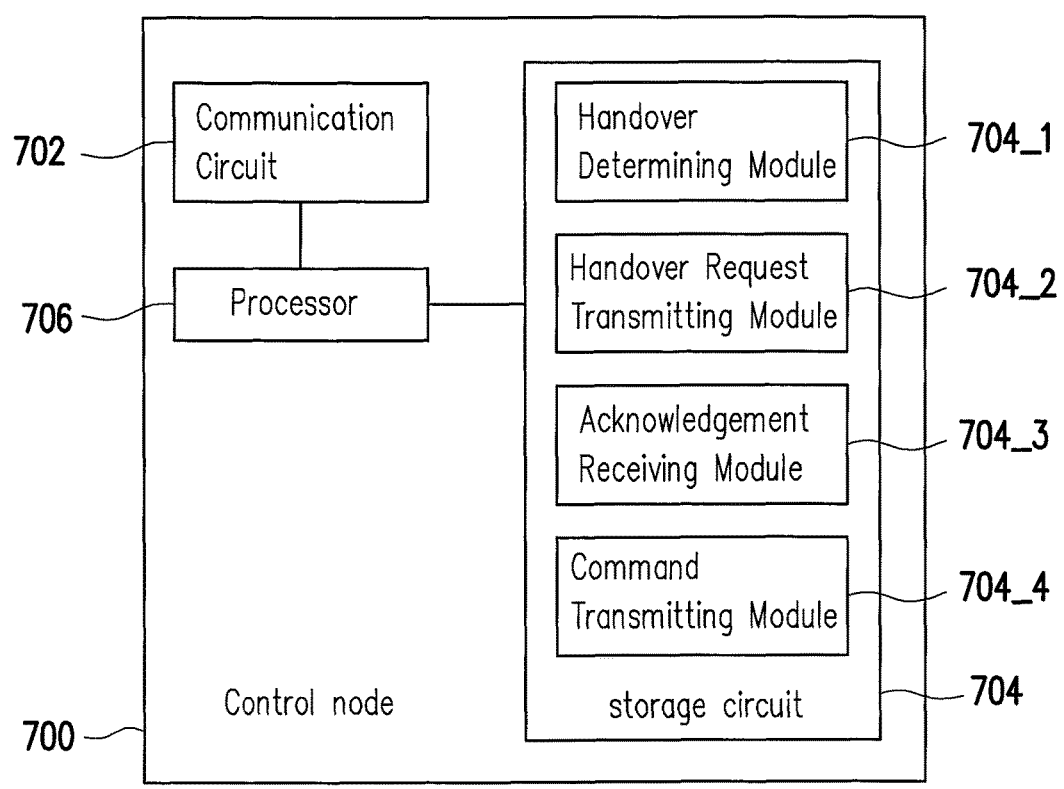
FIG. 7 is a block diagram illustrating the control node according to another embodiment of the disclosure.

FIG. 7 is a block diagram illustrating the control node according to another embodiment of the disclosure. In the present embodiment, a control node 700 may be a source control node serving the D2D communication between first UE and second UE. The control node 700 may include a communication circuit 702, a storage circuit 704 and a processor 706. The possible implementation of the communication circuit 702, the storage circuit 704 and the processor 706 could be referred to the communication circuit 302, the storage circuit 304 and the processor 306 of FIG. 3, which would not be repeated herein. In the present embodiment, the processor 706 may access and execute a handover determining module 704_1, a handover request transmitting module 704_2, an acknowledgement receiving module 704_3 and a command transmitting module 704_4 stored in the storage circuit 704 to perform a method of performing handover procedure for D2D communications of the present disclosure.

Figure 8:
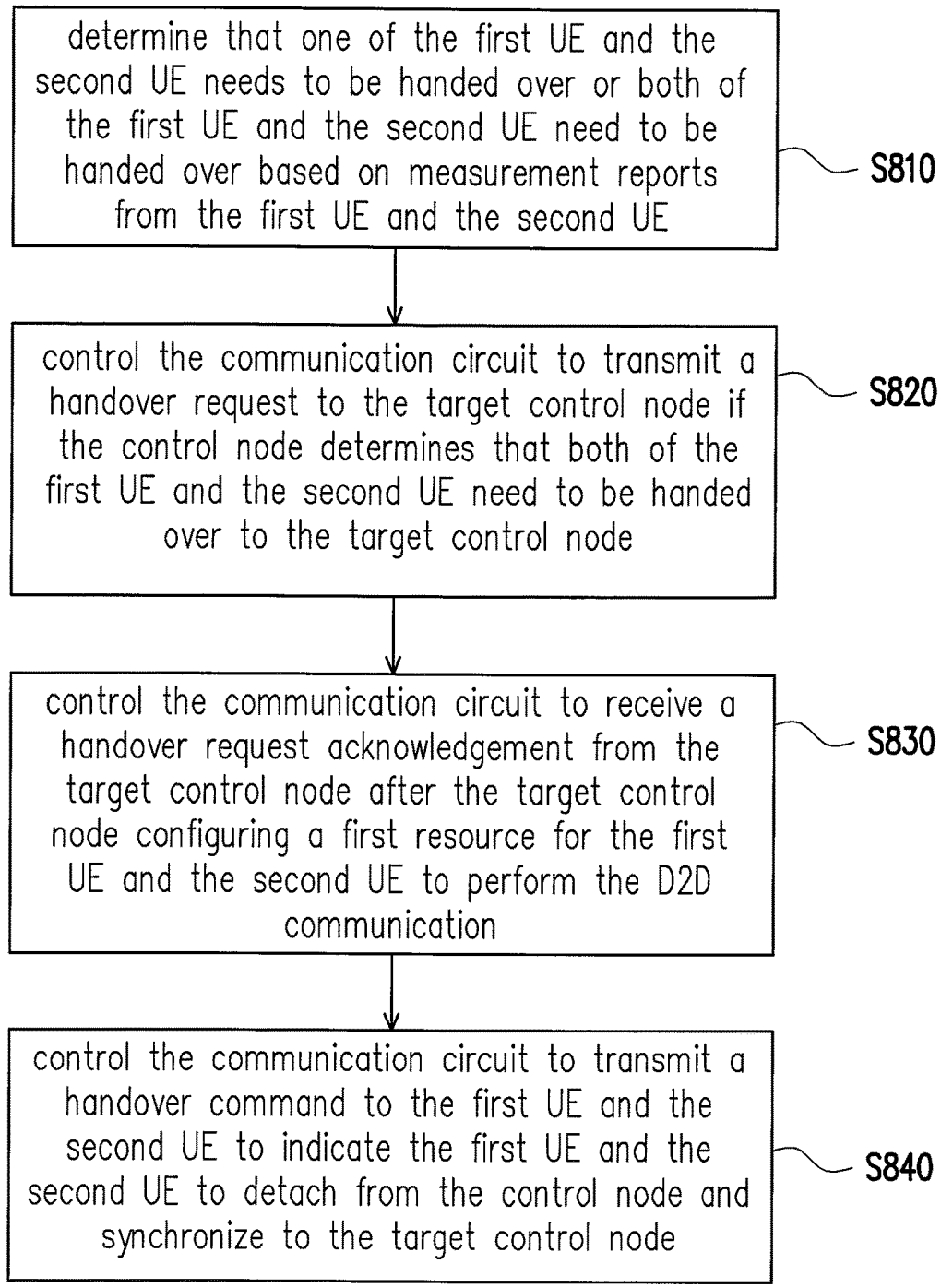
FIG. 8 is a flowchart illustrating a method of performing joint handover procedure for D2D communications according to an embodiment of the disclosure.

Referring to FIG. 8, FIG. 8 is a flowchart illustrating a method of performing joint handover procedure for D2D communications according to an embodiment of the disclosure. The method of the present embodiment may be performed by the control node 700 in FIG. 7, and each step of the method will be described with reference to each element depicted in FIG. 7. The method proposed in the present embodiment could be regarded as being performed after step S420 of FIG. 4, but the disclosure is not limited thereto.

In step S810, the handover determining module 704_1 may determining that one of the first UE and the second UE needs to be handed over or both of the first UE and the second UE need to be handed over based on measurement reports from the first UE and the second UE. The implementation of steps S810 is the same as or similar to that in step S430, which may be deduced with reference to the description related thereto and thus, will not be repeated.

In step S820, the handover request transmitting module 704_2 may control the communication circuit 702 to transmit a handover request to the target control node if the control node 700 determines that both of the first UE and the second UE need to be handed over to the target control node based on measurement reports from the first UE and the second UE.

The handover request is used during the Handover Preparation phase. The handover request is delivered by the control node 700 to the target control node, where the handover request includes some necessary information to prepare the handover for the target control node. The information included in the handover request may include, for example, target cell ID (e.g. E-UTRAN Cell Global Identifier), UE context information (such as UE Aggregated maximum bit rate, UE security capability, D2D handover type (i.e., joint handover procedure or half handover procedure), D2D bearer, etc) and UE history information.

After that, the target control node begins the handover preparation upon receiving the handover request to ensure the seamless service provision for the first UE and the second UE. The target control node checks whether the same quality of service (QoS) provided by the control node 700 is available at the target control node as well based on the received information. If no, the target control node sends Handover Preparation Failure to the control node 700. It is noted that the target control node also sends Handover Preparation Failure to the control node 700 if resource allocation at the target control node fails.

If yes, the target control node notifies the ProSe Function that the D2D pair is performing the handover and the ProSe Function authenticates identification of the first UE and the second UE. Then, the target control node reserves radio resource control (RRC) resources to be used by the first UE and the second UE over the radio link, and allocates cell radio network temporary identifier (C-RNTI) value that the first UE and the second UE need to access the target control node.

In step S830, the acknowledgement receiving module 704_3 may control the communication circuit 702 to receive a handover request acknowledgement from the target control node after the target control node configuring a first resource for the first UE and the second UE to perform the D2D communication, wherein the handover request acknowledgement is used to inform the control node that the target control node is able to serve the D2D communication.

In the present embodiment, the target control node may configure a first resource for the first UE and the second UE to perform the D2D communication. If the target control node is capable of providing the qualified service quality, it will deliver a handover request acknowledgement to the control node 700 after the resource allocation is successfully completed. It is noted that the handover request acknowledgement is used to inform the control node that the target control node is able to serve the D2D communication, which may include the information that the first UE and the second UE need to access the target control node, such as (but not limited to), target C-RNTI and preamble assignment. Thus, the control node 700 receives a handover request acknowledgement from the target control node.

Subsequently, in step S840, the command transmitting module 704_4 may control the communication circuit 702 to transmit a handover command to the first UE and the second UE to indicate the first UE and the second UE to detach from the control node 700 and synchronize to the target control node.

In the present embodiment, since the target control node is capable of providing the qualified service quality, once the control node 700 completes the handover preparation with the target control node, it orders the first UE and the second UE to perform a handover by sending a handover command, which is a joint handover command message. It is noted that the joint handover command message may contain a group-based ID, a unicast-based ID, a cell identification (e.g. C-RNTI) of the target control node and dedicated random access preambles, but the disclosure is not limited thereof. The group-based ID may be a pre-configured layer-2 group identifier that may be used to address a set of users at the 3GPP lower layers. In one embodiment, the group-based ID may include a first UE ID or a second ID, e.g., the address of the first UE or the second UE, which indicate the multicast address, but the disclosure is not limited thereof. In other embodiment, the group-based ID may be an EPC ProSe User ID, which is an identifier for EPC-level ProSe Discovery and EPC support for direct communication that uniquely identifies a UE registered for ProSe. This identifier can be occasionally reassigned by the ProSe Function. In this way, the first UE and the second UE may perform the handover successively according to the EPC ProSe User ID. In addition, the dedicated random access preambles are allocated by the target control node for the first UE and the second UE to perform a contention-free random access procedure after the first UE and the second UE synchronizing to the target control node.

In the present disclosure, the joint handover command message may indicate which UE needs to be handed over. For example, the command transmitting module 704_4 may control the communication circuit 702 to transmit a handover command to the first UE and the second UE according to a first UE ID and a second UE ID contained in the handover command to indicate the first UE and the second UE to detach from the control node 700 and synchronize to the target control node.

Further, the control node 700 informs the target control node which uplink/downlink (UL/DL) packet should be received or sent by sending an SN Status Transfer message. The control node 700 forwards the DL packets received from the S-GW to the target control node through the X2 transport bearer established between the control node 700 and the target control node. So the first UE and the second UE detach from the control node 700. Now, all packet delivery between the first UE and the control node 700 and all packet delivery between the second UE and the control node 700 are stopped, but D2D communications between the first UE and the second UE still continues. Then, the first UE and the second UE detect the synchronization signal from the target control node to perform the synchronization to the target control node.

The target control node sends the timing alignment information and the information of D2D resources to the first UE and the second UE. Once synchronized, the first UE and the second UE initiate the non-contention based random access and perform a contention-free random access procedure by using the dedicated random access preamble. When the first UE and the second UE have successfully access the target control node, the first UE and the second UE send a Handover Confirm message as included in the RRC Connection Reconfiguration Complete message to confirm the handover respectively. Now, the first UE and the second UE can send/receive packets to/from the target control node respectively. In the meanwhile, D2D communications still continues. The D2D seamless handover has completed.

In other embodiment, the storage circuit 704 may further comprise a resource releasing module 704_5. The resource releasing module 704_5 may release second resources for originally serving the D2D communication between the first UE and the second UE after receiving a resource releasing message from the target control node. In the present embodiment, once the first UE and the second UE complete the radio access to the target control node successfully, the bearer path of the first UE and the second UE is now connected to the target control node rather than the control node 700. Therefore, the control node 700 will wait for a UE Context Release message to release second resources for originally serving the D2D communication between the first UE and the second UE from the target control node. The second resources include such as the D2D resources and related resources associated to the first UE and the second UE.

Since D2D communication handover of the first UE and the second UE have completed, the target control node sends a Path Switch request message to the MME to inform that the first UE and the second UE have changed to attach to the target control node so that the EPS bearer path can be modified accordingly. The MME requests the S-GW for S1 bearer modification. Then, the S-GW establishes a DL S1 bearer that connects to the target control node. The S-GW stops sending DL packets to the control node 700, and begins to send them to the target control node through the newly established DL bearer. After that, the MME informs the target control node that the DL S1 bearer path has been modified. And the target control node transmits the UE Context Release message to the control node 700, which allows the control node 700 to release the second resources originally used by the first UE and the second UE. Finally, upon reception of the UE Context Release message from the target control node, the control node 700 can release the second resources mentioned above.

In some embodiments, the joint handover procedure cannot be performed because the first UE and the second UE in ongoing D2D communications are not in close proximity to each other, or because only one of the first UE and the second UE needs to be handed over to its neighboring cell. For the purpose of maintaining the service continuity, the control node 700 may perform the half handover procedure to hand over the first UE and the second UE to the target control node successively. In the following discussion, the first UE would be assumed to be the one that needs to be handed over to the target control node, but the disclosure is not limited thereto.

Figure 9:
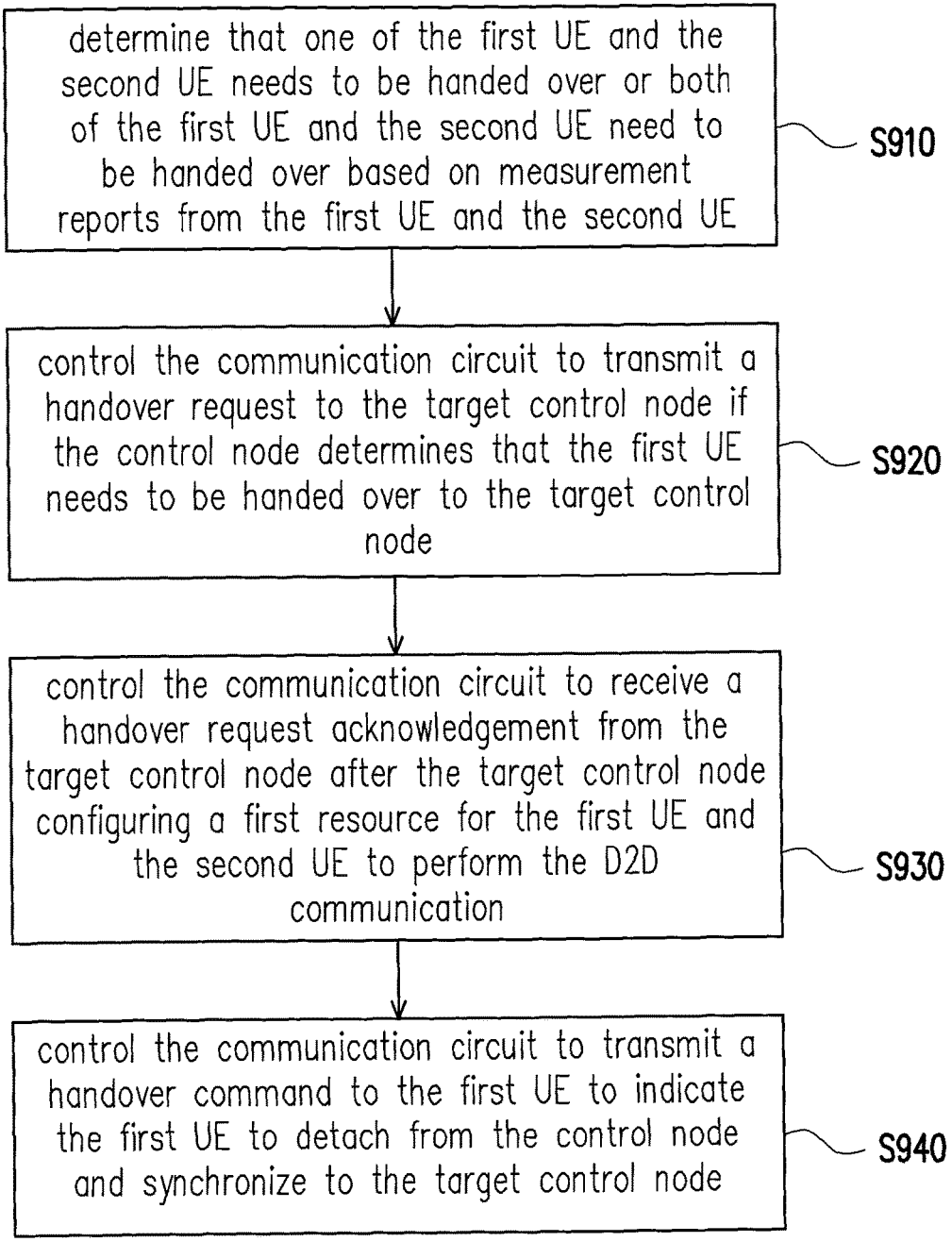
FIG. 9 is a flowchart illustrating a method of performing half handover procedure for D2D communications according to an embodiment of the disclosure.

Referring to FIG. 9, FIG. 9 is a flowchart illustrating a method of performing half handover procedure for D2D communications according to an embodiment of the disclosure. The method of the present embodiment may also be performed by the control node 700 in FIG. 7, and each step of the method will be described with reference to each element depicted in FIG. 7. The method proposed in the present embodiment could be regarded as being performed after step S420 of FIG. 4, but the disclosure is not limited thereto.

In step S910, the handover determining module 704_1 may determining that one of the first UE and the second UE needs to be handed over or both of the first UE and the second UE need to be handed over based on measurement reports from the first UE and the second UE. The implementation of steps S910 is the same as or similar to that in step S430, which may be deduced with reference to the description related thereto and thus, will not be repeated.

In step S920, the handover request transmitting module 704_2 may control the communication circuit 702 to transmit a handover request to the target control node if the control node 700 determines that the first UE needs to be handed over to the target control node based on measurement reports from the first UE and the second UE.

After the control node 700 determines that the first UE needs to be handed over to the target control node, the handover request transmitting module 704_2 may also control the communication circuit 702 to request a handover by transmitting a handover request to the target control node in the same way as stated in step S820. The major difference between the step S820 and S920 is that D2D handover type is the half handover procedure.

After that, the target control node begins the handover preparation upon receiving the handover request to ensure seamless service provision for the first UE and the second UE described above in the same way. That is, the target control node checks whether the same QoS provided by the control node 700 is available at the target control node as well based on the received information. If no, the target control node sends handover Preparation Failure to the control node 700; If yes, the target control node reserves RRC resources to be used by the first UE and the second UE over the radio link, and allocates C-RNTI value that the UEs need to access the target control node.

In step S930, the acknowledgement receiving module 704_3 may control the communication circuit 702 to receive a handover request acknowledgement from the target control node after the target control node configuring a first resource for the first UE and the second UE to perform the D2D communication, wherein the handover request acknowledgement is used to inform the control node 700 that the target control node is able to serve the D2D communication. It is noted that the first resource would be prepared before one of the first UE and the second UE performing handover and will be used after both of the first UE and the second UE performing handover to the target control node.

In the present embodiment, if the target control node is capable of providing the qualified service quality, it will deliver a handover request acknowledgement to the control node 700 in the same way as stated in step S830 after the first resource allocation is successfully completed, which would not be repeated herein.

In step S940, the command transmitting module 704_4 may control the communication circuit 702 to transmit a handover command to indicate the first UE to detach from the control node 700 and synchronize to the target control node.

In the present embodiment, since the target control node is capable of providing the qualified service quality, once the control node 700 completes the handover preparation with the target control node, it orders the first UE to perform a handover by sending a handover command, which is a half handover command message. However, the source node may also transmit the half handover command to the second UE to indicate the second UE to detach from the control node 700 and synchronize to the target control node in a handover trigger time.

Similar to the joint handover command message, the half handover command message may also contain a group-based ID, a unicast ID, a cell identification (e.g., C-RNTI) of the target control node and a dedicated random access preamble, but the disclosure is not limited thereof. In one embodiment, the group-based ID may also include a first UE ID and a second ID, e.g., the address of the first UE and the second UE, which indicate the multicast address. In other embodiment, the group-based ID may be an EPC ProSe User ID, which is an identifier for EPC-level ProSe Discovery and EPC support for WLAN direct communication that uniquely identifies a UE registered for ProSe. This identifier can be occasionally reassigned by the ProSe Function.

The half handover command message may also indicate which UE needs to be handed over by one of three different methods. The methods include: (1) the first UE will perform the handover when it receives the half handover command specified to it. Correspondingly, the second UE will store the half handover command when it receives the half handover command which does not specified to it, and then wait to trigger handover to the target control node the next trigger time; (2) the first UE will perform the handover when it receives the half handover command which does not specified to it. Correspondingly, the second UE will store the half handover command when it receives the half handover command which specified to it, and then wait to trigger handover to the target control node the next trigger time; (3) there are two different kinds of half handover command messages for the first UE and the second UE respectively. The first UE and the second UE determine whether to perform handover right away or wait to the next trigger time according to the indications in the half handover commands respectively. In this way, the first UE and the second UE may perform the handover successively according to the corresponding half handover command message.

In the present embodiment, the command transmitting module 704_4 controls the communication circuit 702 to transmit a half handover command according to a first UE ID contained in the handover command to indicate the first UE to detach from the control node 700 and synchronize to the target control node. The command transmitting module 704_4 controls the communication circuit 702 to transmit the same half handover command according to a second UE ID which does not contained in the handover command to indicate the second UE to detach from the control node 700 and synchronize to the target control node in a handover trigger time.

In addition, the control node 700 informs the target control node which UL/DL packet should be received or sent by sending an SN Status Transfer message. The control node 700 forwards the DL packets received from the S-GW to the target control node through the X2 transport bearer established between the control node 700 and the target control node. So the first UE detaches from the control node 700. Now, all packet delivery between the first UE and the control node 700 is stopped, but D2D communications between the first UE and the second UE still continues. Then, the first UE detects the synchronization signal from the target control node to perform the synchronization to the target control node.

The target control node sends the timing alignment information and the information of D2D resources to the first UE. Once synchronized, the first UE initiates the non-contention based random access and performs a contention-free random access procedure by using the dedicated random access preamble. When the first UE has successfully accessed the target control node, the first UE sends a handover confirm message as included in the RRC Connection Reconfiguration Complete message to confirm the handover. Now, the first UE can send/receive packets to/from the target control node. In the meanwhile, D2D communications still continues. But it should be noted that before the second UE hands over to the target control node, the first UE, which has handed over to the target control node, and the second UE, which are still served by the control node 700, still use a second resources to perform the D2D communication between the first UE and the second UE, where the second resources is a resource for originally serving the D2D communication in the control node 700.

Next, the second UE, which has stored half handover command message, waits to trigger the handover to the target control node. The target control node measured by the second UE should be the same as the target control node that the first UE hands over to. Therefore, HO Trigger is the handover trigger timer which starts counting when the second UE receives the half handover command.

If the second UE satisfies the equation (3) and (4) or the equation (1) and (2) which are the handover condition mentioned above before the handover trigger timer times out, the second UE also detaches from the control node 700 and uses the stored half handover command message to detect the synchronization signal from the target control node to perform the synchronization to the target control node. The target control node sends the timing alignment information and the information of D2D resources to the second UE. Once synchronized, the second UE also initiates the non-contention based random access and performs a contention-free random access procedure by using the dedicated random access preamble. When the second UE has successfully accessed the target control node, the second UE also sends a handover confirm message as included in the RRC Connection Reconfiguration Complete message to confirm the handover. Now, the second UE can send/receive packets to/from the target control node. In the meanwhile, the D2D seamless handover has completed.

Thus, similar to the joint handover procedure, the storage circuit 704 may further comprise a resource releasing module 704_5. Once the control node 700 performs the half handover for the first UE and the second UE successfully, the resource releasing module 704_5 may release the second resources for originally serving the D2D communication between the first UE and the second UE in the same way upon reception of the UE Context Release message from the target control node as stated in above, which would not be repeated herein.

However, in some other embodiments, the second UE would not trigger the handover to the target control node in the half handover procedure. Thus, the half handover for the second UE fails. There are two reasons of the half handover failure for the second UE. The first reason is that the second UE may not cross the serving control node 700 during the HO Trigger. The second reason is that the radio signal quality of D2D pair is below the D2D threshold and this phenomenon continues longer than the duration of the HO Trigger if the first UE and the second UE are moving away from each other.

In the above situations, since the radio signal quality of D2D pair degrades as the time passes by, the first UE and the second UE will switch from D2D communications to cellular communications. It is noted that the first UE in cellular communications would transmit data to the target control node and the second UE in cellular communications would receive the data via the control node 700 since the first UE have handed over to the target control node and the second UE is still served by the control node 700. Therefore, D2D communications for the first UE and the second UE is interrupted and both of the control node 700 and the target control node will release D2D resources for originally serving the D2D communication between the first UE and the second UE respectively.

In summary, in the method of performing the handover procedure and a method of making a handover decision for D2D communications and a control node proposed by the embodiments of the disclosure, there are two types of handover procedures including the joint handover procedure and the half handover procedure. The control node can make a handover decision which is suitable for the ProSe capable UEs in D2D communications to perform the corresponding handover procedure via triggering conditions. In the joint handover procedure, the ProSe capable UEs can handover from the source control node to the target control node together. In the half handover procedure, the control node allows the ProSe capable UEs to hand over successively. As a result, through the mechanism of performing the corresponding handover procedure, the method proposed by the disclosure not only reduces extra information exchange but also provides the ProSe service continuity enhancement, and further suits for intra-PLMN communications and inter-PLMN communications.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims and their equivalents.

What is claimed is:
1. A method of performing a handover procedure for device-to-device (D2D) communications applicable to a first control node serving a D2D communication between a first user equipment (UE) and a second UE, comprising:
  requesting the first UE and the second UE to report measurement reports;
  receiving the measurement reports from the first UE and the second UE, wherein the measurement reports comprise a radio signal quality of the D2D communication;

determining whether one of the first UE and the second
UE needs to be handed over or both of the first UE and
the second UE need to be handed over based on the
measurement reports from the first UE and the second
UE;
transmitting a handover request to a second control node
if the first control node determines that both of the first
UE and the second UE need to be handed over to the
second control node;
receiving a handover request acknowledgement from the
second control node after the second control node
configuring a first resource for the first UE and the
second UE to perform the D2D communication,
wherein the handover request acknowledgement is
used to inform the first control node that the second
control node is able to serve the D2D communication;
and
transmitting a handover command to the first UE and the
second UE to indicate the first UE and the second UE
to detach from the first control node and synchronize to
the second control node,
wherein the step of determining whether one of the first
UE and the second UE needs to be handed over or both
of the first UE and the second UE need to be handed
over based on the measurement reports from the first
UE and the second UE comprises:
determining whether the radio signal quality of the
D2D communication is greater than a D2D threshold
and a D2D trigger greater than a third Time to
Trigger (TTT);
if the radio signal quality of the D2D communication
is greater than the D2D threshold and the D2D
trigger greater than the third TTT, determining that
both of the first UE and the second UE need to be
handed over; and
if the radio signal quality of the D2D communication
is below the D2D threshold or if the radio signal
quality of the D2D communication is greater than
the D2D threshold but the D2D trigger is below
the third TTT, determining that one of the first UE
and the second UE needs to be handed over.

2. The method according to claim 1, wherein the step of
requesting the first UE and the second UE to report the
measurement reports further comprising:
assigning D2D measurement identification (ID) for the
first UE and the second UE, which identifies the first
UE and the second UE to measure the radio signal
quality of the D2D communication between the first
UE and the second UE; and
assigning a measurement list for the first UE and the
second UE, wherein the measurement list comprises
the IDs of the first control node and the second
control node.

3. The method according to claim 2, wherein the first
control node and the second control node are served by
different telecommunication operators.

4. The method according to claim 2, wherein the measurement reports comprise a first measurement report from
the first UE and a second measurement report from the
second UE,
wherein the first measurement report comprises the radio
signal quality of the D2D communication between the
first UE and the second UE, a first radio signal quality
between the first UE and the first control node, and a
second radio signal quality between the first UE and the
second control node,
wherein the second measurement report comprises the
radio signal quality of the D2D communication
between the first UE and the second UE, a third radio
signal quality between the second UE and the first
control node, and a fourth radio signal quality between
the second UE and the second control node.

5. The method according to claim 2, wherein after the step
of transmitting the handover command to the first UE and
the second UE to request the first UE and the second UE to
detach from the first control node and synchronize to the
second control node, the method further comprising:
releasing a second resource for originally serving the D2D
communication between the first UE and the second
UE after receiving a resource releasing message from
the second control node.

6. The method according to claim 2, wherein the step of
transmitting the handover command to the first UE and the
second UE to indicate the first UE and the second UE to
detach from the first control node and synchronize to the
second control node further comprising:
transmitting the handover command to the first UE and
the second UE according to a first UE ID and a second
UE ID contained in the handover command,
wherein the handover command further comprises a cell
identification of the second control node and a dedicated random access preamble, wherein the dedicated
random access preamble is allocated by the second
control node for the first UE and the second UE to
perform a contention-free random access procedure
after the first UE and the second UE synchronizing to
the second control node.

7. A control node, adapted to serve a device-to-device
(D2D) communication between a first user equipment (UE)
and a second UE, comprising:
a communication circuit;
a storage circuit, storing a plurality of modules; and
a processor, coupled to the communication circuit and the
storage circuit, and configured to access and execute
the modules stored by the storage circuit, wherein the
modules comprise:
a measurement request module, controlling the communication circuit to request the first UE and the
second UE to report measurement reports;
a measurement receiving module, controlling the communication circuit to receive the measurement
reports from the first UE and the second UE, wherein
the measurement reports comprise a radio signal
quality of the D2D communication;
a handover determining module, determining whether
one of the first UE and the second UE needs to be
handed over or both of the first UE and the second
UE need to be handed over based on the measurement reports from the first UE and the second UE;
a handover request transmitting module, controlling the
communication circuit to transmit a handover
request to another control node if the handover
determining module determines that both of the first
UE and the second UE need to be handed over to the
another control node;
an acknowledgement receiving module, controlling the
communication circuit to receive a handover request
acknowledgement from the another control node
after the another control node configuring a first
resource for the first UE and the second UE to
perform the D2D communication, wherein the handover request acknowledgement is used to inform the control node that the another control node is able to serve the D2D communication; and a command transmitting module, controlling the communication circuit to transmit a handover command to the first UE and the second UE to indicate the first UE and the second UE to detach from the control node and synchronize to the another control node, wherein the handover determining module determines whether the radio signal quality of the D2D communication is greater than a D2D threshold and a D2D trigger greater than a third Time to Trigger (TTT);

if the radio signal quality of the D2D communication is greater than the D2D threshold and the D2D trigger greater than the third TTT, the handover determining module determines that both of the first UE and the second UE need to be handed over; and if the radio signal quality of the D2D communication is below the D2D threshold or if the radio signal quality of the D2D communication is greater than the D2D threshold but the D2D trigger is below the third TTT, the handover determining module determines that one of the first UE and the second UE needs to be handed over.

8. A method of performing a handover procedure for device-to-device (D2D) communications applicable to a first control node serving a D2D communication between a first user equipment (UE) and a second UE, comprising:

requesting the first UE and the second UE to report measurement reports;

receiving the measurement reports from the first UE and the second UE, wherein the measurement reports comprise a radio signal quality of the D2D communication;

determining whether one of the first UE and the second UE needs to be handed over or both of the first UE and the second UE need to be handed over based on the measurement reports from the first UE and the second UE;

transmitting a handover request to a second control node if the first control node determines that the first UE needs to be handed over to the second control node;

receiving a handover request acknowledgement from the second control node after the second control node configuring a first resource for the first UE and the second UE to perform the D2D communication, wherein the handover request acknowledgement is used to inform the first control node that the second control node is able to serve the D2D communication; and transmitting a handover command to the first UE to indicate the first UE to detach from the first control node and synchronize to the second control nod;

wherein the step of determining whether one of the first UE and the second UE needs to be handed over or both of the first UE and the second UE need to be handed over based on the measurement reports from the first UE and the second UE comprises:

determining whether the radio signal quality of the D2D communication is greater than a D2D threshold and a D2D trigger greater than a third Time to Trigger (TTT);

if the radio signal quality of the D2D communication is greater than the D2D threshold and the D2D trigger greater than a third TTT, determining that both of the first UE and the second UE need to be handed over; and if the radio signal quality of the D2D communication is below the D2D threshold or if the radio signal quality of the D2D communication is greater than the D2D threshold but the D2D trigger is below the third TTT, determining that one of the first UE and the second UE needs to be handed over.

9. The method according to claim 8, wherein the method further comprising:

transmitting the handover command to the second UE according to a second UE ID contained in the handover command to indicate the second UE to detach from the first control node and synchronize to the second control node in a handover trigger time, wherein the step of transmitting the handover command to the first UE to indicate the first UE to detach from the first control node and synchronize to the second control node further comprising:

transmitting the handover command to the first UE according to a first UE ID contained in the handover command.

10. The method according to claim 8, wherein the step of requesting the first UE and the second UE to report the measurement reports further comprising:

assigning D2D measurement identification (ID) for the first UE and the second UE, which identifies the first UE and the second UE to measure the radio signal quality of the D2D communication between the first UE and the second UE; and assigning a measurement list for the first UE and the second UE, wherein the measurement list comprises the IDs of the first control node and the second control node.

11. The method according to claim 10, wherein the first control node and the second control node are served by different telecommunication operators.

12. The method according to claim 10, wherein the measurement reports comprise a first measurement report from the first UE and a second measurement report from the second UE, wherein the first measurement report comprises the radio signal quality of the D2D communication between the first UE and the second UE, a first radio signal quality between the first UE and the first control node, and a second radio signal quality between the first UE and the second control node, wherein the second measurement report comprises the radio signal quality of the D2D communication between the first UE and the second UE, a third radio signal quality between the second UE and the first control node, and a fourth radio signal quality between the second UE and the second control node.

13. The method according to claim 9, wherein the handover command comprises a cell identification of the second control node and a dedicated random access preamble, wherein the dedicated random access preamble is allocated by the second control node for the first UE or the second UE to perform a contention-free random access procedure.

14. A control node, adapted to serve a device-to-device (D2D) communication between a first user equipment (UE) and a second UE, comprising:

a communication circuit;

a storage circuit, storing a plurality of modules; and a processor, coupled to the communication circuit and the storage circuit, and configured to access and execute the modules stored by the storage circuit, wherein the modules comprise:

a measurement request module, controlling the communication circuit to request the first UE and the second UE to report measurement reports;

a measurement receiving module, controlling the communication circuit to receive the measurement reports from the first UE and the second UE, wherein the measurement reports comprise a radio signal quality of the D2D communication;

a handover determining module, determining whether one of the first UE and the second UE needs to be handed over or both of the first UE and the second UE need to be handed over based on the measurement reports from the first UE and the second UE;

a handover request transmitting module, controlling the communication circuit to transmit a handover request to another control node if the handover determining module determines that the first UE needs to be handed over to the another control node;

an acknowledgement receiving module, controlling the communication circuit to receive a handover request acknowledgement from the another control node after the another control node configuring a first resource for the first UE and the second UE to perform the D2D communication, wherein the handover request acknowledgement is used to inform the control node that the another control node is able to serve the D2D communication; and a command transmitting module, controlling the communication circuit to transmit a handover command to the first UE to indicate the first UE to detach from the control node and synchronize to the another control node, wherein the handover determining module determines whether the radio signal quality of the D2D communication is greater than a D2D threshold and a D2D trigger greater than a third Time to Trigger (TTT);

if the radio signal quality of the D2D communication is greater than the D2D threshold and the D2D trigger greater than the third TTT, the handover determining module determines that both of the first UE and the second UE need to be handed over; and if the radio signal quality of the D2D communication is below the D2D threshold or if the radio signal quality of the D2D communication is greater than the D2D threshold but the D2D trigger is below the third TTT, the handover determining module determines that one of the first UE and the second UE needs to be handed over.

15. A method of making a handover decision in a handover procedure for device-to-device (D2D) communications applicable to a first control node serving a D2D communication between a first user equipment (UE) and a second UE, comprising:

requesting the first UE and the second UE to report measurement reports;

receiving the measurement reports from the first UE and the second UE, wherein the measurement reports comprise a fifth radio signal quality between the first UE and the second UE; and determining whether one of the first UE and the second UE needs to be handed over, both of the first UE and the second UE need to be handed over, or none of the first UE and the second UE need to be handed over based on the measurement reports, wherein the step of determining whether one of the first UE and the second UE needs to be handed over or both of the first UE and the second UE need to be handed over based on the measurement reports from the first UE and the second UE comprises:

determining whether the fifth radio signal quality is greater than a D2D threshold and a D2D trigger greater than a third Time to Trigger (TTT);

if the fifth radio signal quality is greater than the D2D threshold and the D2D trigger greater than the third TTT, determining that both of the first UE and the second UE need to be handed over; and if the fifth radio signal quality is below the D2D threshold or if the fifth radio signal quality is greater than the D2D threshold but the D2D trigger is below the third TTT, determining that one of the first UE and the second UE needs to be handed over.

16. The method according to claim 15, wherein the measurement reports comprise a first radio signal quality between the first UE and the first control node, a second radio signal quality between the first UE and the second control node, a third radio signal quality between the second UE and the first control node, and a fourth radio signal quality between the second UE and the second control node.

17. The method according to claim 16, wherein the step of determining whether one of the first UE and the second UE needs to be handed over, both of the first UE and the second UE need to be handed over, or none of the first UE and the second UE need to be handed over based on the measurement reports comprising:

determining whether the second radio signal quality is greater than a sum of the first radio signal quality and a first handover margin (HOM) and a first handover trigger is greater than a first TTT;

if the second radio signal quality is greater than the sum of the first radio signal quality and the first HOM and the first handover trigger is greater than the first TTT, determining whether the first radio signal quality is greater than a system threshold;

if the first radio signal quality is greater than the system threshold, determining whether the fourth radio signal quality is greater than a sum of the third radio signal quality and a second HOM and a second handover trigger is greater than a second TTT;

if the fourth radio signal quality is not greater than the sum of the third radio signal quality and the second HOM or the second handover trigger is not greater than the second TTT, determining that none of the first UE and the second UE need to be handed over.

18. The method according to claim 17, wherein if the fourth radio signal quality is greater than the sum of the third radio signal quality and the second HOM and the second handover trigger is greater than the second TTT, the method further comprising:

determining whether the third radio signal quality is greater than the system threshold;

if the third radio signal quality is greater than the system threshold, determining that none of the first UE and the second UE need to be handed over.

19. The method according to claim 17, wherein if the second radio signal quality is not greater than the sum of the first radio signal quality and the first HOM or the first handover trigger is not greater than the first TTT, determining that none of the first UE and the second UE need to be handed over.

20. The method according to claim 17, wherein if the first radio signal quality is not greater than the system threshold, the method further comprising:

determining whether the fourth radio signal quality is greater than a sum of the third radio signal quality and a second HOM and a second handover trigger is greater than a second TTT;
if the fourth radio signal quality is not greater than the sum of the third radio signal quality and the second HOM or the second handover trigger is not greater than the second TTT, determining that one of the first UE and the second UE needs to be handed over.

21. The method according to claim 20, wherein if the fourth radio signal quality is greater than the sum of the third radio signal quality and the second HOM, and the second handover trigger is greater than the second TTT, the method further comprising:
determining whether the third radio signal quality is greater than the system threshold;
if the third radio signal quality is not greater than the system threshold, determining that both of the first UE and the second UE need to be handed over.

22. The method according to claim 19, wherein if the third radio signal quality is greater than the system threshold, the method further comprising:
determining whether the fifth radio signal quality is greater than a D2D threshold and a D2D trigger is greater than a third TTT;
if the fifth radio signal quality is greater than the D2D threshold and the D2D trigger is greater than the third TTT, determining that both of the first UE and the second UE need to be handed over; and
if the fifth radio signal quality is below the D2D threshold or if the fifth radio signal quality is greater than the D2D threshold but the D2D trigger is below the third TTT, determining that one of the first UE and the second UE needs to be handed over.

23. A control node, adapted to make a handover decision in a handover procedure for device-to-device (D2D) communications between a first user equipment (UE) and a second UE, comprising:
a communication circuit;
a non-transitory storage circuit, storing a plurality of modules; and
a processor, coupled to the communication circuit and the storage circuit, and configured to access and execute the modules stored by the non-transitory storage circuit, wherein the modules comprise:
a measurement request module, controlling the communication circuit to request the first UE and the second UE to report measurement reports;
a measurement receiving module, controlling the communication circuit to receive the measurement reports from the first UE and the second UE, wherein the measurement reports comprise a radio signal quality between the first UE and the second UE; and
a handover determining module, determining whether one of the first UE and the second UE needs to be handed over, both of the first UE and the second UE need to be handed over, or none of the first UE and the second UE need to be handed over based on the measurement reports,
wherein the handover determining module determines whether the radio signal quality is greater than a D2D threshold and a D2D trigger greater than a third Time to Trigger (TTT);
if the radio signal quality is greater than a D2D threshold and a D2D trigger greater than the third TTT, the handover determining module determines that both of the first UE and the second UE need to be handed over; and
if the radio signal quality is below the D2D threshold or if the radio signal quality is greater than the D2D threshold but the D2D trigger is below the third TTT, the handover determining module determines that one of the first UE and the second UE needs to be handed over.

* * * * *